T. BRADLEY.
Hand-Seeder.
No. 69,170.  Patented Sept 24, 1867.
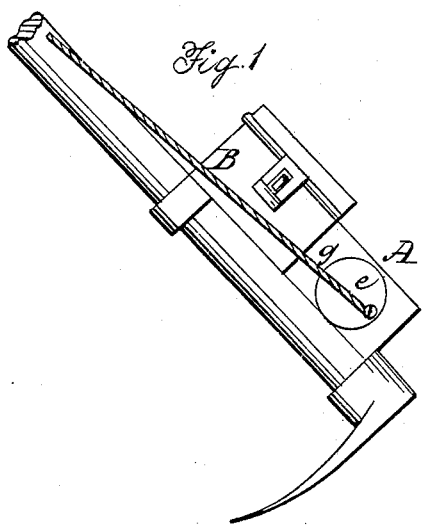
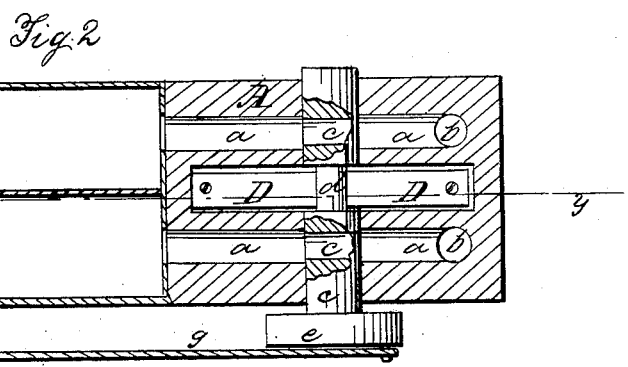
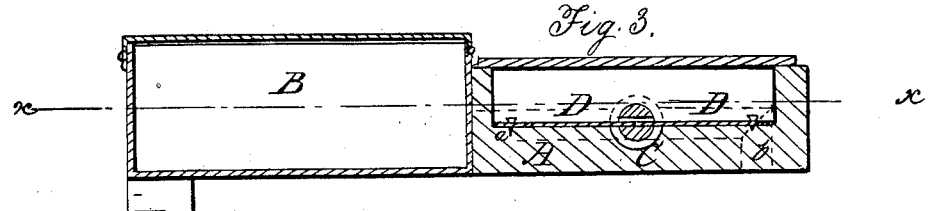
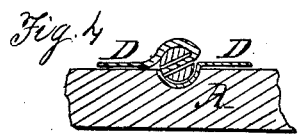
Witnesses:
Theo. Tusche
Wm. Trevin
Inventor:
Thos. Bradley
Per Munn & Co
Attorneys

United States Patent Office.

THOMAS BRADLEY, OF PREBLE, NEW YORK.

Letters Patent No. 69,170, dated September 24, 1867.

---

IMPROVEMENT IN HAND-SEEDERS.

---

*The Schedule referred to in these Letters Patent and making part of the same.*

---

TO ALL WHOM IT MAY CONCERN:

Be it known that I, THOMAS BRADLEY, of Preble, in the county of Cortland, and State of New York, have invented a new and improved Hand-Seeder; and I do hereby declare that the following is a full, clear, and exact description thereof, which will enable others skilled in the art to make and use the same, reference being had to the accompanying drawings forming part of this specification, in which—

Figure 1 represents my improved hand-seeder attached to a hoe.

Figure 2, a longitudinal section, taken in the line $x\,x$, fig. 3, showing the holes for containing the seed in the roller presented to receive the seed, and the elastic spring when expanded.

Figure 3, a longitudinal section, taken in the line $y\,y$, fig. 2, showing the position of the seed-roller cut transversely when the spring is expanded for receiving seed.

Figure 4, a similar view when the elastic spring is contracted for discharging seed.

Similar letters of reference indicate like parts.

The object of this invention is to furnish a cheap and convenient hand-seeder or planter, adapted to seeds of different kinds, and to be connected with a hoe to be operated by hand to discharge the seeds in the hole made by the hoe.

The planter is made of a piece of pine or other suitable plank, about six inches long, four inches broad, two inches thick. A is the piece of plank, in which are bored, longitudinally from one end on the sides, two holes $a\,a$, about three-quarters of an inch in diameter, terminating in two holes $b\,b$ bored through the plank thickwise. On one end of the plank is attached a seed-box, B, divided into two compartments for holding different kinds of seeds that are planted together, such as corn and pumpkins. The holes $a\,a$ open into the compartments of the seed-box B. A roller or pin, C, is fitted in a hole bored across the plank A, to intersect the holes $a\,a$, and in the roller C are made cavities $c\,c$, of different sizes, according to the size of the seed and the number of each kind to be planted. These cavities are made in the roller at the points of intersection with the holes $a\,a$ to open into them. The middle part of the roller C is made to form a small neck, $d$, through which passes an elastic strap, D, that lies in a recess made lengthwise in the piece of plank A, and secured at each end. At one end of the roller C is a disk or plate-crank, $e$, to which is attached a cord, $g$, by which the roller may be turned half-way around or nearly so, in such manner that when the seed cavities $c\,c$ are presented towards the seed-box B for receiving the seed through the holes $a\,a$, their position will be reversed by the action of the elastic strap D, and the seed will then be discharged along the forward ends of the holes $a\,a$, and down through the holes $b\,b$. It will be seen that the elastic spring D, fastened at both ends, will draw the roller C in a position with the seed cavities $c\,c$, towards the seed-box B when contracted, and that the spring is expanded by pulling the cord $g$ to turn the roller C around and reverse the position of the seed cavities $c\,c$ for discharging the seed. Thus by pulling and relaxing the cord $g$ the elastic spring D will expand and contract, and the seeds will enter the cavities $c\,c$ and be discharged as required through the holes $b\,b$.

Having thus described my invention, I claim as new, and desire to secure by Letters Patent—

The arrangement with the hoe of the roller C with the cavities $c\,c$, operated by the cord $g$ in conjunction with the elastic spring D, to receive the seeds from the box B through the holes $a\,a$ in the plank piece A, and discharge them through the holes $b\,b$, substantially as described.

THOMAS BRADLEY.

Witnesses:
CHESTER MARKHAM,
F. H. MARKHAM.